ETCHING CONTROL DEVICE

Filed Oct. 24, 1965 2 Sheets-Sheet 1

INVENTOR
E.C. JUBB JR.
BY Louis A Scholz
ATTORNEY

Jan. 5, 1971 E. C. JUBB, JR 3,553,052

ETCHING CONTROL DEVICE

Filed Oct. 24, 1965 2 Sheets-Sheet 2

E. C. JUBB, JR. INVENTOR.

BY Louis A Scholz

ATTORNEY 3,553,052
ETCHING CONTROL DEVICE
Elmer Charles Jubb, Jr., Baltimore, Md., assignor to Louis A. Scholz, Sykesville, Md.
Filed Oct. 24, 1965, Ser. No. 504,436
Int. Cl. C23f 1/00, 1/02
U.S. Cl. 156—345 15 Claims

ABSTRACT OF THE DISCLOSURE

This invention pertains to improvements in controllers for automatic etching machines; for example, those that are used in etching printed circuits, and, more particularly, for the improvement in controllers comprising using a separately web-carried monitor test material with multiple sampling capability.

This invention relates to apparatus and methods of etching graphic material surfaces, such as art plates, thin metal webs or panels, and metal clad or laminated panels; and more particularly it relates to control and signalling devices and systems responsive to the parameters affecting the etching operation.

Articles in the category of thin metal webs and other metallic parts suitable to be conveyed through and processed by etching machines include graphic art plates, electric motor laminations, television masks, intricate flat spring steel parts, transformer laminations, printed circuits and microwave attenuators, each being provided with exposed areas and resist masked areas. The etchant fluid removes material and forms perforations in the exposed areas only. The metal or material clad panels referred to are predominately printed circuit boards, these boards generally having both sides provided with metal cladding on a flat backing or substrate, usually an insulative panel. An acid resist pattern on the metal preserves the metal circuit portions which are to be retained on the insulative panel.

Difficulty with etching processes resides in the fact that in the ordinary etching operation, in spite of the utmost skill and care used by the operator, there is always the danger of excessive undercutting or incomplete removal of the metal, or over coating material.

Heretofore control units in order to indicate or signal and control the etching operation have used some form of discrete sample which must be replaced after each etch cycle and selected according to the nature and structure of the subject to be etched. Examples of devices and methods using this approach are U.S. Pat. Nos. 2,762,035; 2,983,062; 2,762,036; 2,701,183; 3,032,753; 2,168,407.

An object of the present invention is to provide a method and apparatus by which similar workpieces subjected to an etching process can be monitored to control material parameters such as the length of time the workpiece or pieces are exposed to the action of the etchant.

A further object of this invention is to provide a method of:

(a) Monitoring depths of etching
(b) Monitoring amount that a workpiece has been chemically affected, milled and etched
(c) Signaling the strength of an etchant
(d) Signaling the activity of an etchant under variable conditional operation
(e) Indicating and controlling a predetermined depth of metal etch or removal by chemical action
(f) By electrochemical action.

The preferred embodiment is shown in FIG. 1 of this invention, showing a partial elevational view with a schematic wiring diagram.

This invention is particularly applicable in use in conjunction with a conveyor carried workpiece apparatus similar to that described in U.S. Pat. 3,082,774 and manufactured by Chemcut Corp. or etcher Model 8000 manufactured by "DEA" Products, Inc., which may be described, as is already known in the art, as variable speed drive continuously (or continually) conveyed automatic etching machines.

This invention can also control the etching of continuous sheets or webs of flexible metal foil or printed wiring boards or more simply used as a signal to indicate etchant strength under certain given conditions and thus assist in manual control.

The amount of etching that takes place is determined in part by the thickness of the metal to be etched, design of the pattern being etched, force with which the etchant strikes the work, etching time, temperature of the etchant, contaminants and reaction products in solution, and strength or concentration of the etchant. One way of etching satisfactory parts is to hold all of the variables constant after selecting the proper operating conditions. However, it is extremely difficult to hold the last three variables constant. The temperature will rise and fall with the cycling of the etchant solution, of the heaters and the turning on and off of the etcher, and of the ambient temperature changes. In addition the etching reactions are usually exothermic, adding heat to the bath which must be removed by a means such as a cooling system. The strength of the etchant is constantly changing because of the chemical reaction taking place and the contamination and dilution of the solution with rinse water and "drag-in" of precleaners.

Figure 1:
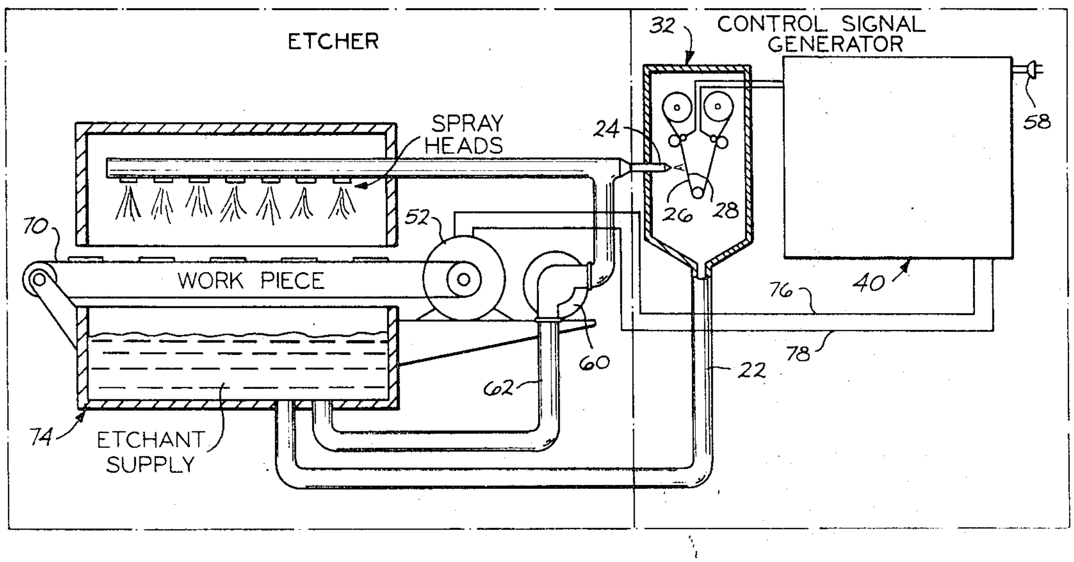
FIG. 1 is a diagrammatic partially sectionalized elevational view of a continuous spray etcher employing the present etching control invention.

Presently parts are etched for example by holding the temperature of the etching solution to within plus/minus 3 degrees Farenheit and manually adjusting the etching time (time the parts being etched are exposed to the etchant) as the strength of the etchant changes. This technique of manually adjusting the etching time requires a skilled operator, is dependent on an error reading, slows down the output of the etcher, and causes a number of parts to be reworked or scrapped which increases the cost of the process. The etching time is changed by the operator by changing the speed of the conveyor carrying the work through the etcher. The slower the conveyor speed the longer the etching time.

APPARATUS FOR CONTROLLING ETCHING TIME

The controller 20 shown herein continuously samples the etchant 21 and uses about one percent of the etchant to spray this etch, from the etchant solution reservoir tank 74 under conveyor 70, through a single nozzle 24 onto a strip of copper metal 26 or the metal with which the parts to be etched are coated. The metal strip 26 preferably about ⅛" wide and about 500' long is laminated to a plastic substrate 28 and wound on a supply reel 30. One end of the metal-plastic strip is passed through a small etching chamber 32 and attached to a take-up reel 34. Before entering and just after leaving the etching chamber the metal strip passes over and makes electrical contact with two metal rods or roller contacts 54 (one before 36 and one after 38 the chamber). Through experimentation it has been found that when the metal strip is continuous, the resistance between the rollers is less than 5 ohms when the length between the two rollers is about four inches. After the metal has been etched the gap in the metal caused the resistance to be greater than 500 ohms. The time that lapses between the time when the resistance of strip 26 is 5 ohms and when it becomes 500 ohms as a result of the etching action, by nozzle 24 squirting etchant liquid 21 against the strip of copper 26 on substrate 28, is the test time and this test etch time can be equal to but preferably is a fraction of the object etch time. This time can be correlated to the etching time of any pattern and thickness of metal object to be etched. By using this correlation for a particular type of part and etchant the time required to etch the metal strip can be used to control the speed of a conveyor.

In the conveyor controller that has been built, a single cycle operation comprises the following sequence of mechanical-electrical cooperation, the two rods 36, 38 on the etching chamber 32 are connected to a resistance relay 42 which turns on a 1 r.p.m. synchronous motor 50 when the resistance is less than 500 ohms and turns it off when the resistance is greater than 500 ohms in a manner known in the art. The shaft 68 of the synchronous motor 50 is mechanically connected to a potentiometer 48 which controls the setting of a motor driven variable transformer 56.

Included in the potentiometer circuit are two other potentiometers 64 and 66 which are used to vary the relationship between the resulting position of the potentiometer variable resistances 48, as set by the synchronous motor and the relationship of the position of variable transformer 56. The variable transformer in turn controls the voltage supplied to the D.C. motor 52 which drives the conveyor. The longer it takes to etch the metal strip 26 the longer the synchronous 50 motor runs, the lower the setting of the transformer 56, and the less voltage supplied to the conveyor drive motor 52. This slows the speed of the conveyor and increases the object etching time.

Through a series of timers and relays by methods known in the art power is not supplied to the drive motor 46 of the variable transformer 56 until the synchronous motor 50 has stopped running with the logical result that there is no change of speed of conveyor drive motor 52 made at anytime during the actual operation of the test cell 32, but change is made immediately following each test completion, if the time of test is different, either plus or minus, and if therefore the time of operation of the synchronous or timing motor 50 is different. After the variable transformer 56 has been positioned power is removed from the drive motor 46 of the variable transformer 56 and the synchronous motor 50 is run in reverse until it is at its starting position. It is desirable to adjust the timing of the cycle so that at least 3 or 4 cycles take place while one object to be etched is passing from one end of the etching bath to the other. When it is desired to repeat the cycle the motor attached (not shown) to the takeup reel 34 is activated through the use of a preset timer (not shown) and fresh metal strip 26, is pulled (the strip is continuous since the plastic is not affected by the etchant) into the etch chamber. The cycle for the controller takes from 15 to 60 seconds depending on the strength of the etchant. When operating the etcher continuously it should not be necessary to have the controller go through its cycle more than once every five or ten minutes, but in any case the minimum time for operating the etcher to move an object through the etchant must be greater than the maximum time for one test cycle.

The object of this invention is to reduce the variation in the dimensions of the etched parts: for example, lines on "one ounce copper printed wiring boards," the etched dimensions, should be within plus/minus 0.0003 inch.

The output from any one etcher using this controller will be increased.

The number of parts that must be reworked or scraped will be reduced.

The controller will cause changes in the conveyor speed when there are any changes in the activity of the etchant, whether it is caused by change in strength, temperature, or contamination or a combination of these.

And the controller checks the etchant continuously and automatically. The strip of metal-plastic laminate need only be changed when the etchant is changed.

Referring to FIG. 1 the etchant tank 74 has conveyor 70 positioned adjacent and through said tank and the conveyor is driven by motor 52. The speed of this motor 52 is controlled by the output of the computer 40 and is communicated to this conveyor motor 52 by conductors 76 and 78. The input to computer 40 is the output of sample etcher 32 which in turn uses as its etchant a portion of the etchant in tank 74 which is conducted through tube 62 by pump 60 and sprayed through nozzle 24 on to the sample 26 in the manner described for and shown in FIG. 1 above. The sprayed etchant is returned through line 22.

Figure 3:
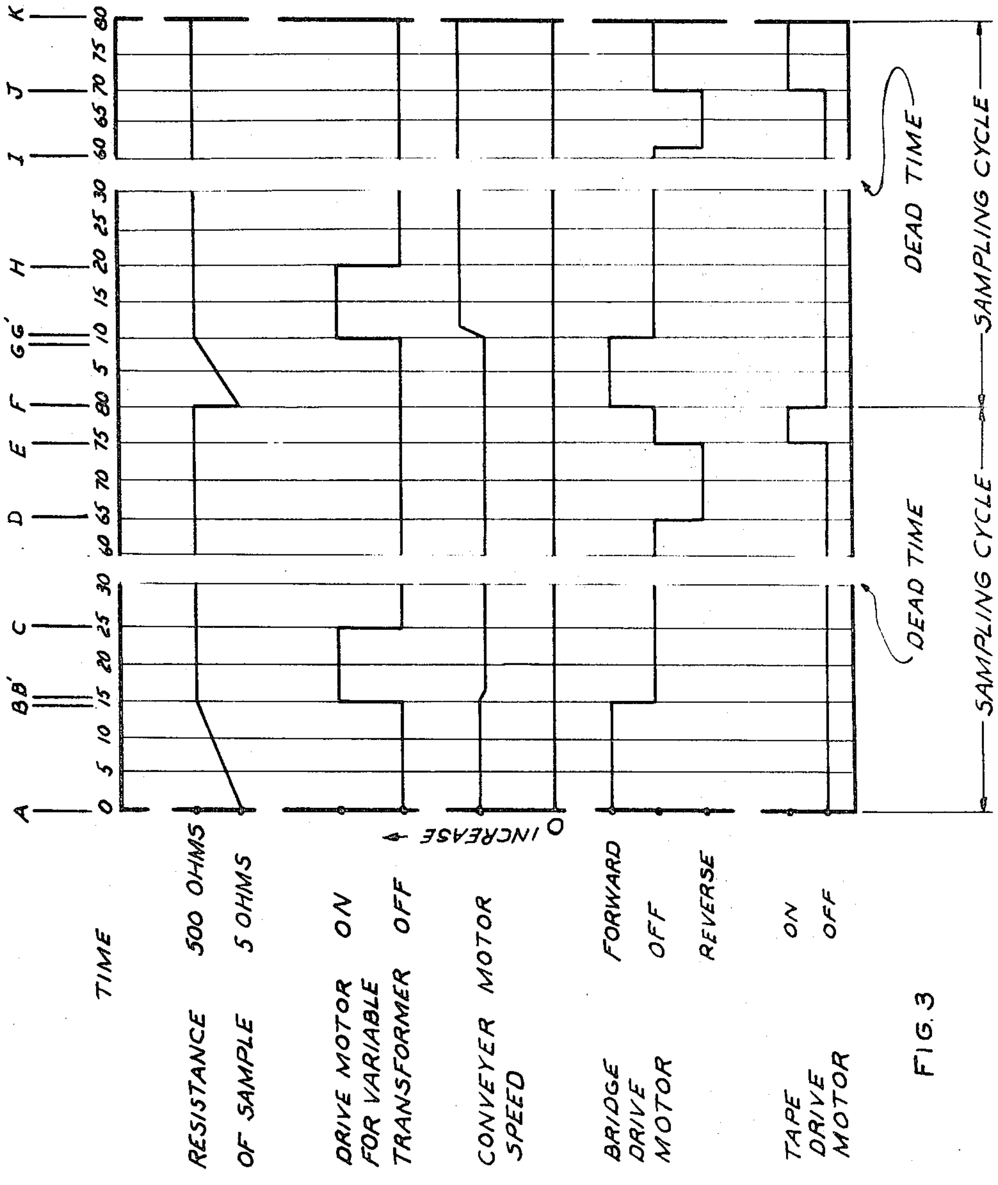
FIG. 3 is a diagrammatic time chart of the invention's operation.

Referring to FIG. 3 we have shown the time sequence of typical operation of this invention.

Figure 2:
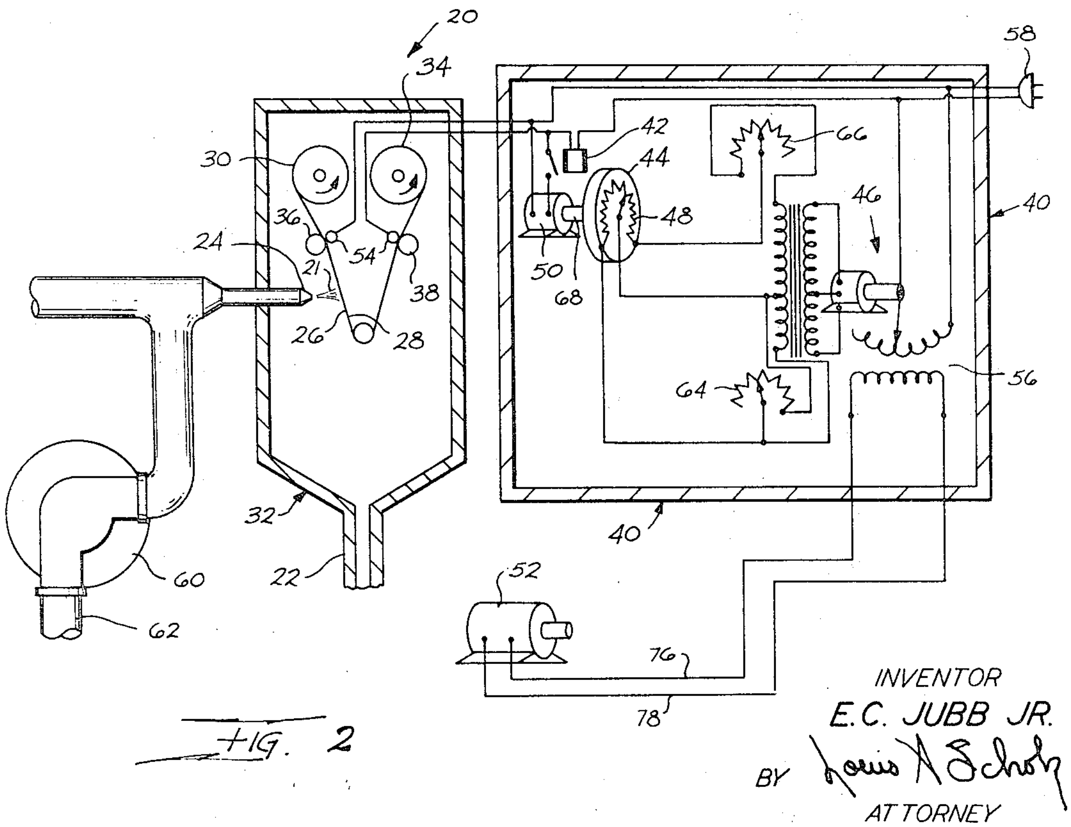
FIG. 2 is a diagrammatic partly sectionalized elevational view of the details of the controller and its connection to the etcher of FIG. 1.

Reading from left to right and starting at the point in time of the cycle where fresh sample tape 28 is in position at point A at 0 seconds, the resistance of the sample 26 is 5 ohms, the motor drive 46 for the variable transformer 56 is in the off position, and the conveyor is running at the speed set by the previous cycle. Also at this time the bridge circuit drive motor 50 is started and the tape drive motor (not shown) has just been turned off. This situation continues until the resistance of sample 26 reaches 500 ohms or a similar higher value with respect to the 5 ohm starting resistance. At this time the sample is usually in a condition of complete disconnect, but the ohms resistance value would not be infinite because of the presence of film of etchant 22. This condition of 500 ohms occurs at point B at which time the variable transformer drive motor 46 is turned on and "homes" on a new position or stays where it has been set according to whether there has been any change in the bridge settings which in turn are proportionally related to the time necessary to etch sample 26. In this example at point B–B′ the motor drive for the variable transformer in response to a new bridge value sought a new position which supplied lower voltage to the conveyor motor 72, FIG. 2 and FIG. 1 and thus the conveyor motor ran the conveyor 70 at a slower speed as indicated in FIG. 3. Further at this time the bridge drive motor is turned off in this new position and the tape drive remains off.

At C a time delay relay not shown, is set at a time just greater than the maximum needed for complete range or time of operation of the drive motor for the variable transformer, and turns off this motor.

At this point in the cycle the time between any successive samplings can be increased by inserting in the sequence of operations a suitable time delay means. At D to E the bridge motor 50 is reversed (to "cock" the bridge) so that its forward operation of displacement will be proportional to the sample etching time. At point E when bridge motor is cocked the tape drive motor is turned on which brings in a fresh sample, this operation continuing until the fresh sample resistance becomes 5 ohms at which time, F, the cycle repeats as above.

Although the invention has been described and illustrated in detail, it is to be clearly understood that the same is by way of illustration and example only and is not to be taken by way of limitation, the spirit and scope of this invention being limited only by terms of the appended claims.

Examples of some other embodiments that might be used would be the use of a strand of wire in place of the copper plastic laminate. The use of a paddle and disc to spray the etchant on the metal in place of the pump and nozzle.

I claim:

1. In an etching apparatus:

(a) controller comprising a test sample exposing means for exposing successively at least two portions of test sample to intimate contact with a portion of the etchant, (b) a measuring and signal means for successively measuring the times necessary to accomplish substantially complete etching of the first and successive portions of said test sample, and forming a time proportional signal (c) an etching process drive rate control means responsive to said measuring means time proportional signed to correlate said test sample time to the time necessary for complete etch.

2. A device as in claim 1 wherein said test sample exposing means is characterized by a continuous flexible strip of relatively inert material coated with an electrically conductive test sample material similar to material to be etched, a pair of electrically operable sensing contacts, said contacts fixed in spaced relationship along a portion of said strip and in electrical contact with said conductive material, a spray supply means in fixed relation to said flexible strip having a nozzle to direct at least a portion of said etchant at said test sample portion.

3. A device as in claim 2 wherein said test time measuring means is characterized by a resistance responsive means, said device responding in a first manner to a low resistance of said test sample and surface attached etchant and in a second and successive manner to a substantially higher resistance of said sample and etchant after sample etch break through, a time measuring means responsive to said two manners of response of said resistance response means having an output proportional to this response.

4. A device as in claim 3 wherein said correlating means comprises a bridge circuit with two arms of said bridges manually variable and the third arm responsive to said etch time measuring means and having an output proportional to the ratio thereof.

5. A device as in claim 1 wherein said time proportional signaling means consist of an audible signal responsive to the output of said time measuring means.

6. A device as in claim 1 wherein said time proportional signaling means is a variable power supply responsive inversely proportionally to said etching time signal and an object conveyor means for conveying the work pieces to be etched into intimate conatct with the etchant, the speed of said conveyor means being proportional, and the time of exposing said objects to the etchant being inversely proportional, to the output of said power supply.

7. In material article etching wherein the etchant eats to a predetermined depth of each of a plurality of articles passing continuously and continually through an article etching zone, the improved process comprising:

setting the articles in constant movement through the etching zone;

sensing on a substantially linear test sample, said sample being carried on a nonetchable web, the discrete time necessary to etch a portion of the predetermined article etch depth;

proportionally multiply, adjusting the rate of the articles passage through the etching zone, in an multiple speed decreasing direction when the sensed sample is being etched less than the proper portion of the said predetermined article etch depth in full;

and conversely proportionally multiply adjusting the rate of the articles passage through the etching zone, in a multiple speed increasing direction when the sensed sample is being etched more than the proper portion of the said predetermined article etch depth in full.

8. Speed control means for the conveyor drive of a conveyorized etcher employed in the etching of surfaces of articles, comprising means for introducing, as a repeatable control element, a nonetchable web mounted elongate fractional test strip of material, means for spraying etchant in a pattern which is substantially at right angles to test material strip axis on the control element to cause breakthrough of the test strip sensing means for detecting time required for breakthrough of test strip, having recycling means to move new portion of test strip into position for succeeding sensing test, means coupled to the sensing means for applying at least two succeeding outputs thereof to the conveyor drive to decrease the speed in response to a proportional article under etch condition and increase the speed in response to a proportional article over etch condition.

9. Speed control means for the conveyor drive of a conveyorized etcher employed in the etching of surfaces of articles, comprising means for introducing, as a control element, a nonetchable web mounted elongate test strip of material, means for spraying etchant in a pattern which is substantially at right angles to test strip material axis on the control element to cause breakthrough of the test strip sensing means for detecting the time required for breakthrough of test strip means coupled to the sensing means for applying the output thereof to the conveyor drive to decrease the speed in response to a proportional article under etch condition and increase the speed in response to a proportional article over etch condition.

10. In an operation of continuously and continually conveying objects in one end of, through, and out the other end of an etcher so as to etch material from the objects to a predetermined depth while constantly in transit:

introduction successively, in a path of exposure to etchant, of at least two nonetchable web mounted portions of an elongated strip of etchable electrically conductive test material having a predetermined relation of proportionality to the material being etched;

dissolution, by etchant spraying in a pattern generally perpendicular to the longest axis of the first portion of said strip of test material to the electrical breakthrough condition of said strips, repeating said dissolution process on at least one successive portion of said test strip material, detection, by sensing time required and delivery of the time proportional signal of at least two successive breakthrough actuated control outputs, of said strip breakthrough condition; and application successively of said breakthrough actuated time proportional signal outputs to said conveying operation to cause a redetermination of a lower proportional conveying operation speed in response to shorter than proportional strip breakthrough time, and conversely.

11. An automated work piece etching device wherein the process is controlled by linear moving electrically conductive coated webbing, comprising:

introducing portion of work piece etchant to said web which is used to sense the time required to achieve electrically discontinuity in web coating one or more repetitive times, so as to detect whether the work piece is sufficiently etched, application of automatic regulated control to workpiece drive means for workpiece being etched in proportionate response to said electrical discontinuity time, so as to adjust the time of contact of etchant with the workpiece, to achieve proper etch depth.

12. The invention of claim 11, characterized by the means of introduction of etchant comprising a substantially flattened nozzle, directed so that the stream of etchant impinges in a pattern of etchant substantially at right angles to the path of conductivity of web coating.

13. The invention of claim 11, wherein the introduction of a portion of the work piece etchant to the web takes place in a separate chamber.

14. An automatic work piece etching machine having conveyorized workpiece etching chamber and power means for applying etchant to work pieces being etched, with controller comprising:

a non-etchable base web coated on at least one side with electrically conductive etchable material, a supply reel and a take-up reel in spaced relationship, said web being movably attached between said reels in tension, a charged pair of electrical contacts in a spaced relationship with each other and in contact with a segment of the electrical conductor of said web, a power means connected to the take-up reel to move periodically said web, a switching means connected between said electrical contacts and said take-up reel power means responsive to electrical conductor segment discontinuity and actuating said take up reel power means until said electrical continuity is re-established, an etchant spray means having a small portion of said work piece etchant directed by using a portion of work piece etchant application power means to impinge upon the segment of electrical conductor at a point midway between said pair of electrical contacts, and substantially transversely to said electrically conductive etchable material path, control means, coupled with takeup reel power means for applying the output thereof to the conveyor drive to change said drive speed in proportion to said conductor break through time, to achieve proper etch depth.

15. The invention of claim 14, wherein the web etching spray means is housed in a chamber separate from the automatic work piece etching chamber.

References Cited

UNITED STATES PATENTS

| | | | |
|---|---|---|---|
| 2,068,352 | 1/1937 | Schlacks | 134—57 |
| 2,979,843 | 4/1961 | Triman | 156—345 |
| 3,082,774 | 3/1963 | Benton et al. | 156—345 |
| 3,401,068 | 9/1968 | Benton | 156—345 |

JACOB H. STEINBERG, Primary Examiner

U.S. Cl. X.R.

156—2, 18, 7